Figure 1:
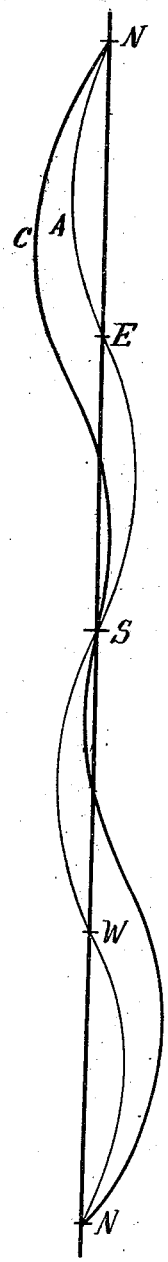

Mar. 13, 1923.

C. H. BEDELL.
COMPENSATING SYSTEM FOR COMPASSES.
FILED APR. 12, 1921.

1,448,050.

Inventor
Charles H. Bedell
By his Attorneys
Pennie, Davis, Marvin & Edmonds

Patented Mar. 13, 1923.

1,448,050

UNITED STATES PATENT OFFICE.

CHARLES H. BEDELL, OF GROTON, CONNECTICUT, ASSIGNOR TO ELECTRIC BOAT COMPANY, A CORPORATION OF NEW JERSEY.

COMPENSATING SYSTEM FOR COMPASSES.

Application filed April 12, 1921. Serial No. 460,712.

*To all whom it may concern:*

Be it known that I, CHARLES H. BEDELL, a citizen of the United States, residing at Groton, in the county of New London, State of Connecticut, have invented certain new and useful Improvements in Compensating Systems for Compasses; and I do hereby declare the following to be a full, clear, and exact description of the invention, such as will enable others skilled in the art to which it appertains to make and use the same.

This invention relates to compass compensation, and more particularly to a method and apparatus for neutralizing the deviating magnetic effects of electric currents used on ships.

Compasses on board ship are affected by magnetic material in their neighborhood; notably the iron or steel of the hull. It is usual to counteract this effect to a certain extent by placing small magnets in close proximity to the compass and so adjusting them that the readings are substantially correct for North, South, East and West. Between these points certain errors results which may be determined for every few degrees and a curve plotted. This curve is called the normal deviation curve and is fixed for any given vessel.

Where there are no other disturbing influences except those of the metallic parts of the vessel, a normal deviation curve may be plotted once and for all, and the ship navigated by it. But where heavy unbalanced currents are employed, as in electrically driven vessels, they constitute a second and very serious source of error which under some circumstances may cause a deviation of 10 to 15 degrees from a true reading. On submarines, currents of several thousand amperes are used, and while the cables carrying these currents are balanced as far as possible, yet certain portions cannot be so installed, and it is the unbalanced portion acting to established a fixed north and south magnetic pole which affects the compass. When the axis of these poles parallels the magnetic axis of the earth the compass reads correct, but for all other positions a correction must be made. This necessitates the plotting of a second deviation curve which must be compounded with the normal curve before an accurate curve can be obtained for navigation.

If deviations due to these unbalanced currents were constant, as are those plotted on the normal curve, a resultant curve could be traced which would serve a given vessel indefinitely. Unfortunately, however, the corrections which must be applied to compensate for the current deviations vary in quantity and sign with the strength and direction of the current. This necessitates the plotting of many current deviation curves, one to be used with each strength and direction of current used and each of these must be compounded with the normal curve.

It is accordingly an object of this invention so to compensate for the current that but one deviation curve will be required irrespective of the strength of that current or its direction of flow. This object may be attained by shunting a part of the current from each disturbing primary conductor or cable, so that it shall flow into proximity to the compass and in such a manner that the magnetic field set up by the shunted current will counteract the effect upon the compass of the magnetic field set up by the current flowing in the primary conductor, irrespective of the strength or direction of the latter. Where a plurality of disturbing primary currents are used a part of each is shunted by the compass so that the entire system will be in equilibrium.

Figure 2:
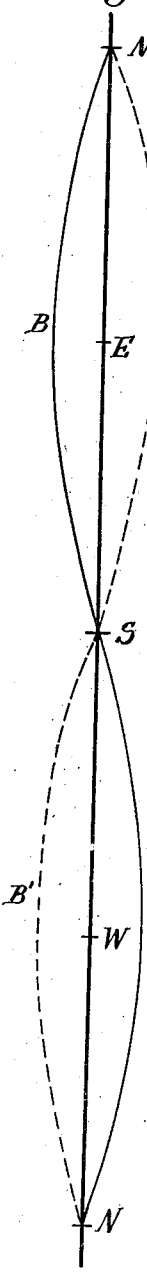
Figure 3:
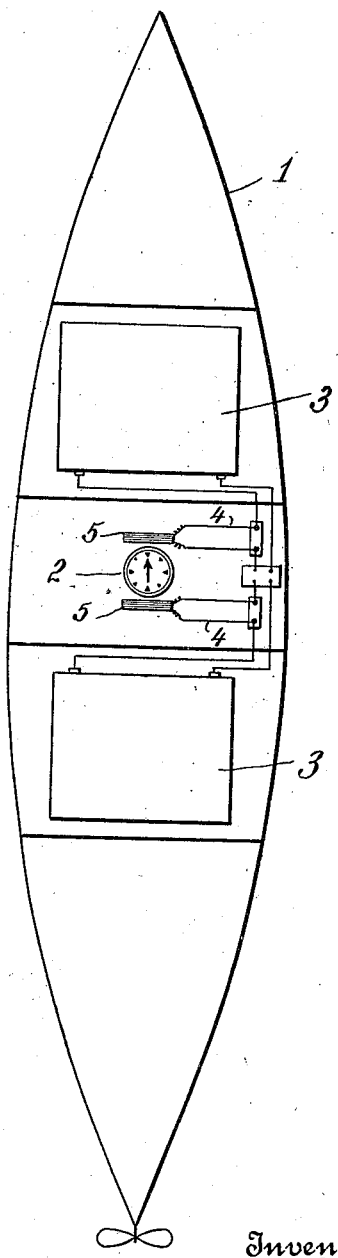

The invention will be more clearly understood after a study of the accompanying drawing, in which Figs. 1 and 2 represent typical deviation curves and Fig. 3 is a diagrammatic plan of a submarine showing the general arrangement of the batteries, cables, compass and compensating coils.

In Fig. 1 curve A represents a normal deviation curve for a vessel in which the fixed compensating compasses have been adjusted so that correct readings are had at the cardinal points. Between these points the compass readings must be corrected in accordance with the values shown by the curves, these corrections varying in magnitude from point to point and changing in sign in successive quarters.

In Fig. 2 curve B represents a current deviation curve, it being assumed for purposes of illustration that the conductor carrying the disturbing current lies along the beam of the vessel so that the lines of magnetic force parallel the keel. In such a case it is clear that the compass would read correctly on North and South. It is, of course, to be borne in mind that this conductor might be at any other angle, in which case the true readings would be other than on North and South.

In order to obtain a true curve by which to navigate it would be necessary to compound curves A and B. This has been done, the resultant curve being curve C, as shown on Fig. 1. If the strength and direction of the disturbing current were fixed the curve C would represent fixed values and could be used indefinitely. As a matter of fact, however, the disturbing currents vary not only in strength but in direction. If the direction of the current, the curve of which is shown in Fig. 2, were reversed the deviation curve would also be reversed and would take the position B' indicated in dotted lines on Fig. 2. This, of course, would necessitate the compounding of a new curve C. This in itself would not be a serious difficulty, as it would result merely in interchanging the upper and lower halves of the curve C, as shown in Fig. 1. However, as the strength of the disturbing current is varied the sagittæ of curve B will increase and decrease, thus making necessary the plotting of many resultant curves C, one to be used for each strength and direction of the disturbing current.

The matter is further complicated by the fact that there may be and often are more than one unbalanced conductor, the strength and direction of the currents flowing in each being subject to variation. It is therefore clear that it would be highly desirable to neutralize, if possible, the deviating influences of these unbalanced currents.

The manner of accomplishing this is shown in Fig. 3 in which 1 represents the hull of a submarine, 2 the compass, and 3 the batteries which furnish the motive power during submergence. One of the cables from each battery is provided with a shunt circuit 4, which includes a coil 5 placed in close proximity to the compass. The amount of the current which actually passes through this shunt is very small and is determined by the resistance of the coil and by the potential drop in the primary conductor between the points at which the shunt circuit enters and leaves. The current passing through the coil sets up a magnetic field much weaker than that set up by the primary conductor itself, but because of its proximity to the compass, of much greater relative influence. The winding of the coil must be such that the field set up by the current passing through it will parallel that of the primary conductor and be of opposite polarity. This being true, it is then only necessary empirically to fix the relative strengths of the primary and coil currents, so that the magnetic influence of the coil field will exactly neutralize the magnetic influence of the conductor field. This once done, it is clear that the compass will be unaffected by any current passing through the primary conductor irrespective of either its strength or direction.

As each primary conductor is provided with its own coil the effect of each is neutralized so that it makes no difference whether variations occur between the two currents. When more than one unbalanced conductor is acting as a disturbing influence it is necessary that the effect of each be neutralized by means of a coil such as described above.

By means of these compensating coils it is possible practically to eliminate the deviation effect of the electric currents used so that curve B approximates a straight line for all strengths and directions of current. This means, of course, that resultant curve C coincides with the normal deviation curve A and is fixed for any given vessel. By the terms "coil" or "coils" as used in the following claims, I mean to include conductors capable of effecting the desired compensation no matter what their specific shape or form may be.

I claim:

1. The method of compensating a compass for errors due to the deviating effect of an electric current, which comprises shunting a part of the current through a coil in proximity to the compass in such a manner that the magnetic effect of the current flowing through the coil shall counteract the magnetic effect of the primary disturbing current irrespective of the strength or direction of the latter.

2. The method of compensating a compass for errors due to the deviating effects of electric currents, which comprises shunting a part of each current through a coil in proximity to the compass in such a manner that the magnetic effects of the currents flowing through the coils shall counteract the magnetic effects of their respective primary disturbing currents irrespective of the strength or direction of the latter.

3. In a ship, the combination of a compass, a conductor in influencing relation to the compass, and a coil in parallel with the conductor and arranged in such relation to the compass that the magnetic field set up by the current passing through the coil acts to neutralize the effect upon the compass of the magnetic field set up by the current passing through the conductor irrespective of the strength or direction of the latter.

4. In a ship, the combination of a compass, a plurality of conductors in influencing relation to the compass and a plurality of coils arranged in such relation to the compass that each coil being parallel with one of the conductors, the magnetic field set up by the currents passing through each coil acting to neutralize the effect upon the compass of the magnetic field set up by the current passing through the corresponding conductor irrespective of the strength or direction of the latter.

In testimony whereof I affix my signature.

CHARLES H. BEDELL.